(12) United States Patent
Watson

(10) Patent No.: US 6,933,645 B1
(45) Date of Patent: Aug. 23, 2005

(54) PERMANENT MAGNET ROTOR AND MAGNET CRADLE

(75) Inventor: Andrew P. Watson, Export, PA (US)

(73) Assignee: Elliott Company, Jeannette, PA (US)

( * ) Notice: Subject to any disclaimer, the term of this patent is extended or adjusted under 35 U.S.C. 154(b) by 3 days.

(21) Appl. No.: 10/818,463

(22) Filed: Apr. 5, 2004

(51) Int. Cl.$^7$ .............................................. H02K 1/28
(52) U.S. Cl. ............................. 310/156.09; 310/156.08
(58) Field of Search ...................... 310/156.08–156.09, 310/156.12–156.14, 156.18–156.19, 156.21–156.23, 310/156.25–156.29, 156.31, 156.48, 156.55, 310/156.59, 156.61, 156.63

(56) References Cited

U.S. PATENT DOCUMENTS

| | | | |
|---|---|---|---|
| 4,336,649 A | * | 6/1982 | Glaser .......................... 29/598 |
| 5,801,470 A | | 9/1998 | Johnson et al. |
| 6,384,504 B1 | * | 5/2002 | Ehrhart et al. ......... 310/156.55 |
| 6,548,932 B1 | | 4/2003 | Weiglhofer et al. |
| 6,603,232 B2 | | 8/2003 | Van Dine et al. |
| 6,700,288 B2 | | 3/2004 | Smith |

FOREIGN PATENT DOCUMENTS

DE    199 51 594    *  5/2001   ............ H02K 1/28

* cited by examiner

Primary Examiner—Burton Mullins
(74) Attorney, Agent, or Firm—The Webb Law Firm

(57) ABSTRACT

A magnet cradle for supporting a permanent magnet in an overhung recessed slot on the surface of a permanent magnet rotor having an axis of rotation. The cradle is non-magnetic and comprises a top and bottom wall abutting the permanent magnet. The cradle is sized to hold the permanent magnet within the overhung slots. Axial end walls generally perpendicular to the axis of rotation have circumferential edges configured to directly abut overhung portions of the slots. The total axial length of the top and bottom walls of the cradles in the axial direction are greater that the total axial length of the magnet, thereby permitting a magnet to fit between the axial end walls of the cradle without the cradle in the magnetic flux path of the magnet.

3 Claims, 7 Drawing Sheets

PERMANENT MAGNET ROTOR AND MAGNET CRADLE

BACKGROUND OF THE INVENTION

One of the challenges in designing high-speed permanent magnet motors is retention of the magnets on the rotor shaft during high-speed operation. Centrifugal force due to rotation of the rotor causes the magnets to exert an outward (radial) force that must be mechanically restrained by the shaft. Since the centrifugal force is proportional to the radius at the center of mass of the magnet and the square of the angular speed, high speed/high power permanent magnet motor designs are difficult.

Permanent magnet motors and alternators use two approaches to mount magnets to the rotor shaft. The first is called surface mounting wherein adhesives are used to bond the magnets to the surface of the rotor shaft. In many designs, the magnets are additionally retained by strapping high-strength, non-metallic bands around the rotor shaft over the magnets. See, for example, Johnson et al. U.S. Pat. No. 5,801,470 entitled "Rotors with Retaining Cylinders and Reduced Harmonic Field Effect Losses" and Van Dine et al. U.S. Pat. No. 6,603,232 entitled "Permanent Magnet Retaining Arrangement for High Speed Rotors". The speed and power of permanent magnet motors or alternators with magnets mounted with this first approach are limited due to the limited strength of the adhesives and bindings. The second approach to magnet retention on permanent magnet rotors is embedding in which the magnets are inserted below the surface of the shaft and are held in place by mechanical means. In one such approach, a ring with axial protrusions retains the magnets. See Smith U.S. Pat. No. 6,700,288 entitled "High Speed Rotor". The ring is attached to the shaft through a dovetail or fir tree fit at each pole on the shaft. With solid rings, the tolerances can stack up between pole attachments causing possible interference with other parts during assembly if the clearances are insufficient. The solid ring is also difficult to machine. A proposed variation of this method involves individual carriers for each magnet instead of a solid ring. See, for example, Weiglhofer et al. U.S. Pat. No. 6,548,932 entitled "Nonmagnetic Magnet Retention Channel Arrangement for High Speed Rotors".

It is an object according to this invention to provide a magnetic retention system for individual magnets held by permanent magnetic rotors. The invention is especially useful in large permanent magnet motors or alternators and is particularly characterized by eliminating all low permeability materials between the magnets, laminations, and the stator poles.

SUMMARY OF THE INVENTION

Briefly, according to this invention, there is provided a permanent magnet rotor assembly comprising a non-magnetic cylindrical shaft having an axis of rotation and a generally cylindrical surface. An even number of recessed and overhung slots in the cylindrical surface define an even number of ribs. A plurality of generally C-shaped high-magnetic permeability laminated stacks surrounds the ribs. Each laminated stack abuts overhung portions of the ribs. A permanent magnet is positioned in each recessed slot. The magnets have spaced circumferential end edge faces abutting the laminated stacks. The magnets have top and bottom faces. Preferably, the top and bottom faces are parallel and the magnets have a trapezoidal shape. The magnets are magnetized with opposite poles at each circumferential end edge face and such that the poles abutting any C-shaped lamination stack are of identical polarity.

A plurality of non-magnetic cradles supports the permanent magnets in the recessed slots. Each cradle has top and bottom walls abutting the top and bottom faces of the permanent magnets and each cradle has axial end walls with circumferential edges of the axial end walls directly abutting overhung portions of the ribs. The total axial length of the top face of the cradles in the axial direction is greater than the total axial length of the lamination stacks and magnets permitting the laminated stacks and magnets to fit between the end walls of the cradle.

The magnets are secured against centrifugal force by the cradles bearing directly on the ribs.

According to a preferred embodiment, there is provided a permanent magnet rotor assembly comprising a non-magnetic cylindrical shaft having an axis of rotation and a generally cylindrical surface with an even number of recessed and overhung slots defining an even number of ribs therebetween. The ribs have a generally T-shaped cross section taken in a plane perpendicular to the said axis of rotation. A plurality of generally C-shaped high-magnetic permeability laminated stacks surrounds the ribs. The separations between individual plates forming the laminated stacks lie in planes perpendicular to the axis of rotation. Each plate has edge faces abutting overhung portions of the ribs.

Permanent magnets are positioned in each recessed slot. The separations between individual permanent magnets lie in planes perpendicular to the axis of rotation. The magnets have spaced circumferential edge faces abutting edge faces of the plates of the laminated stacks. The magnets have generally parallel top and bottom edge faces lying on cords of a cross section of the cylindrical shaft taken perpendicular to the axis of rotation. The magnets are magnetized with opposite poles at each circumferential edge face and such that the poles abutting any C-shaped lamination stack are of identical polarity.

A plurality of non-magnetic cradles supports the permanent magnets in the recessed slots. Each cradle has a top and bottom wall abutting the top and bottom edge faces of the individual sections of the laminated permanent magnets. Each cradle has axial end walls with faces lying in planes perpendicular to the axis of rotation and with edges of the end walls directly abutting overhung portions of the T-shaped ribs. The total axial length of the top and bottom faces of the cradles is greater than the total axial length of the lamination stacks and laminated magnets permitting the laminated stacks and magnets to fit between extensions of the end walls of the cradle.

According to another embodiment, there is provided a magnet cradle for supporting a permanent magnet in an overhung recessed slot on the cylindrical surface of a permanent magnet rotor having an axis of rotation. The cradle being non-magnetic is comprised of top and bottom walls for abutting the radial surfaces of the permanent magnet. The cradle has axial end walls connected to the top and bottom walls. The end walls have faces generally perpendicular to the axis of rotation. The circumferential edges of the axial end walls are configured to directly abut overhung portions of the slots. The total axial length of the top wall of the cradles is greater than the total axial length of the magnet thereby permitting a magnet to fit between the axial end walls of the cradle with no portion of the cradle in the magnetic flux path.

BRIEF DESCRIPTION OF THE DRAWINGS

Further features and other objects and advantages will become clear from the following detailed description made with reference to the drawings in which.

DESCRIPTION OF THE PREFERRED EMBODIMENTS

Figure 1:
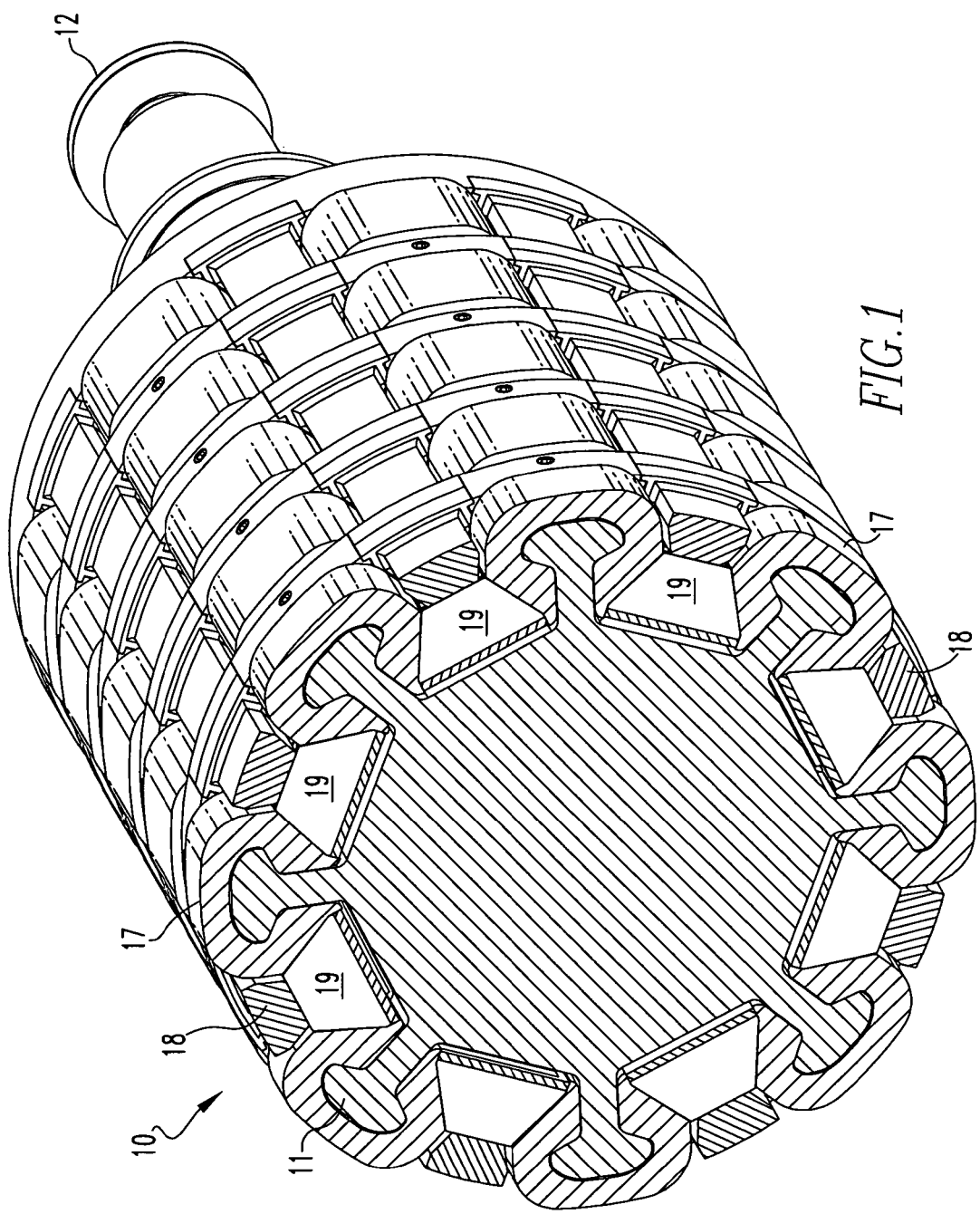
FIG. 1 is a perspective view of the assembled rotor sectioned by a plane perpendicular to the axis or the rotor.
Figure 2:
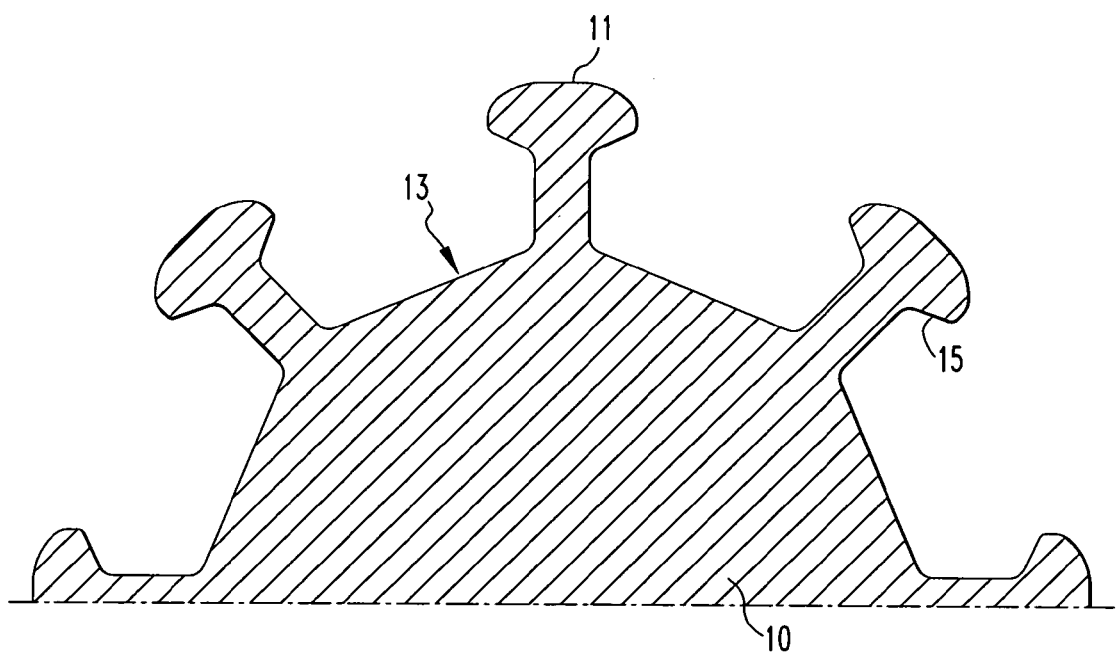
FIG. 2 is a section view of the rotor taken perpendicular to the rotor axis.

Referring to FIG. 1, the shaft 10 comprises the foundation of the permanent magnet rotor according to this invention. The shaft 10 is made of non-magnetic high strength material, such a nickel cobalt alloy. As shown in FIG. 2, the shaft 10 has an interrupted cylindrical surface defined relative to the rotational axis of the rotor. At each end of the shaft, provisions are made for bearings 12. The bearings 12 establish the rotational axis of the rotor. The shaft 10 has an even number of substantially identical recessed and overhung slots 13. The slots 13 define substantially identical generally T-shaped ribs 11 with dovetail surfaces 15 adjacent the slots. The magnets, as will be explained, are positioned within the slots held by a cradle.

Figure 3:
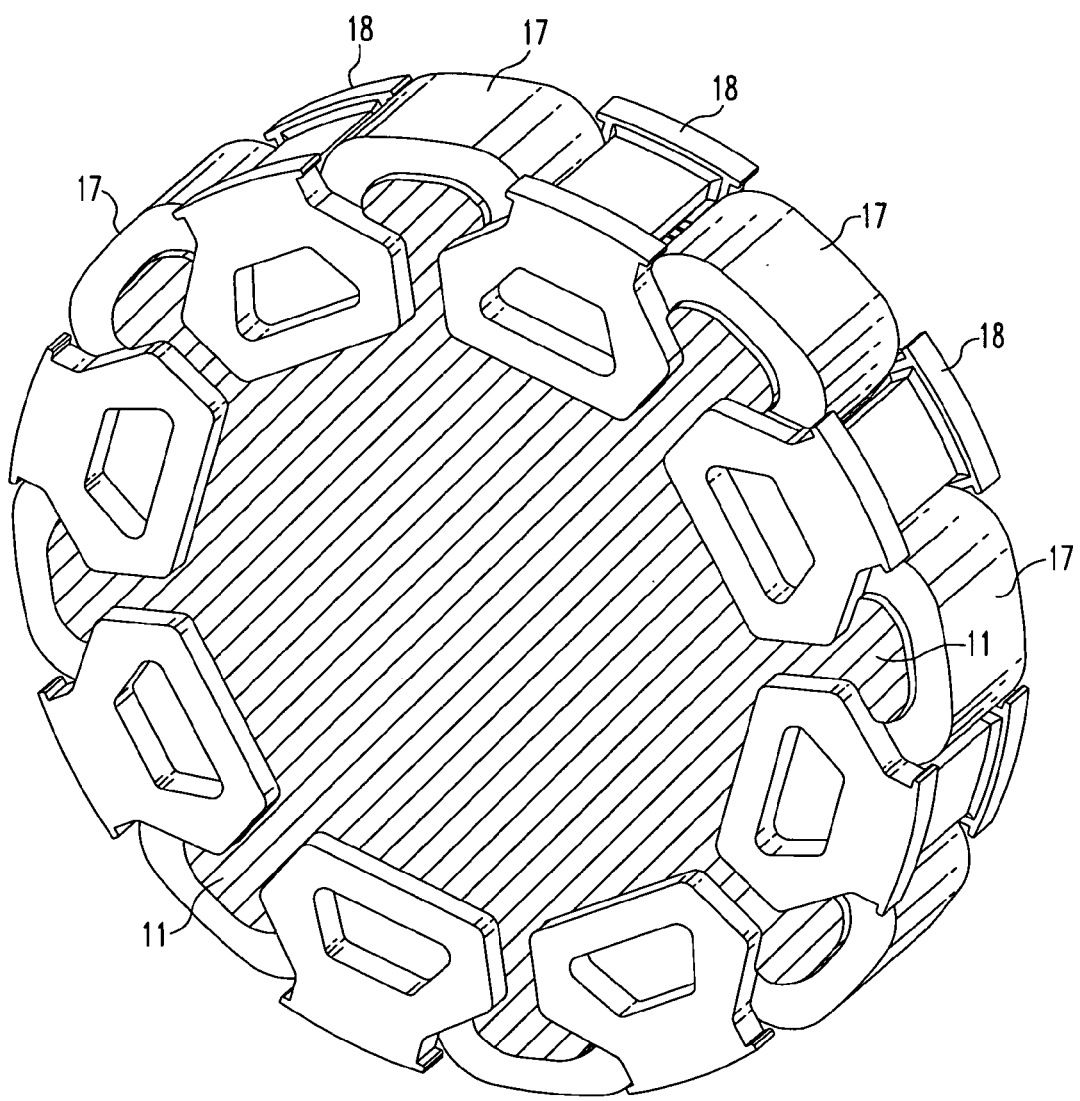
FIG. 3 is an assembled perspective view of a slice of the rotor shaft.
Figure 4:
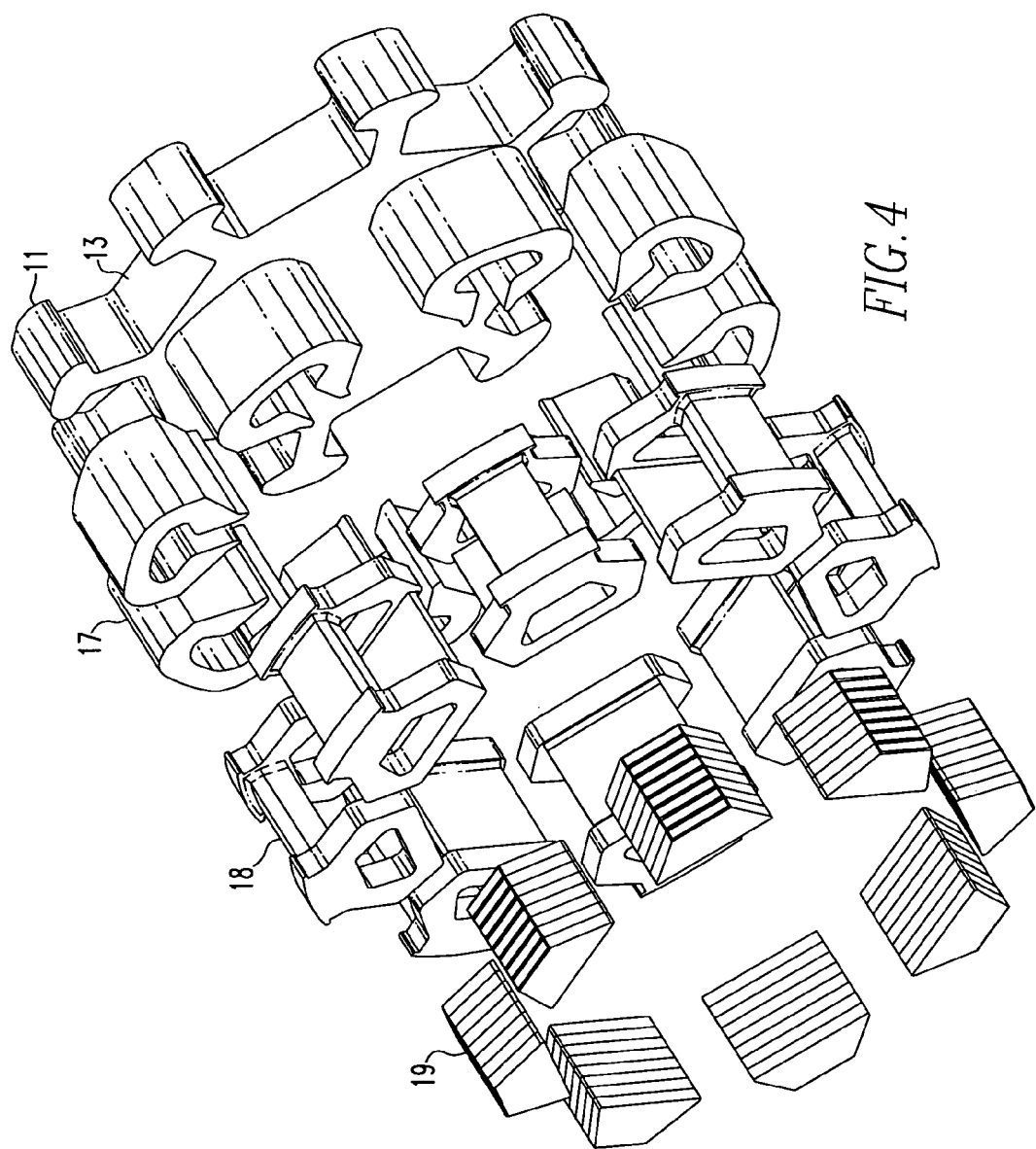
FIG. 4 is an exploded perspective view of a slice of a permanent magnet rotor shaft according to this invention.
Figure 5:
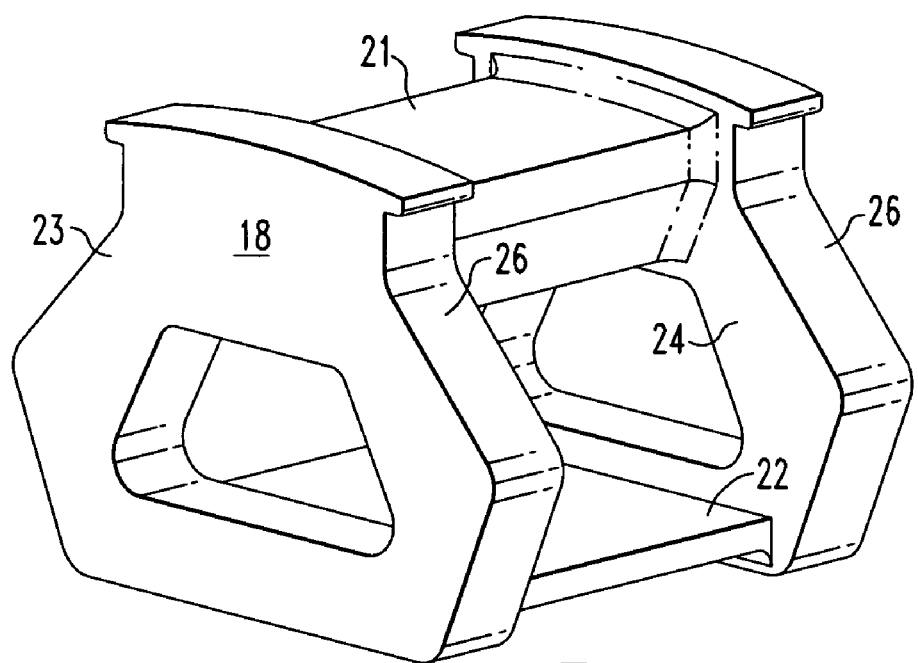
FIG. 5 is a perspective view of a magnet cradle according to this invention.

While the shaft 10 has a continuous cross section (extending axially) in the vicinity of the magnets, it is helpful to consider the shaft in individual sections supporting an even number of magnets. FIG. 3 illustrates such a section broken out of the shaft and FIG. 4 an exploded view of FIG. 3.

A plurality of generally C-shaped lamination stacks 17 comprised of high-magnetic permeability material, such as electrical steel, surrounds the T-shaped ribs 11 as is clearly seen in FIG. 1. The stacks are made up of individual sheets positioned perpendicular to the axis of rotation of the shaft. The sheets have edges that abut the overhung or dovetail surface of the ribs. In this way, the lamination stacks are mechanically secured to resist centrifugal forces when the shaft rotates.

A plurality of non-magnetic cradles 18 for holding permanent magnets is positioned in each slot. Each cradle 18 carries laminated permanent magnets 19. The structure of the cradles is illustrated in FIGS. 4, 6, 7, and 8. Each cradle has a top wall 21 and a bottom wall 22. These walls generally lie in the axial and circumferential directions when the cradle is installed in a slot on the rotor. The top wall 21 abuts the magnets and resists the centrifugal force tending to throw out the magnets when the rotor rotates. The cradles are formed of lightweight non-magnetic structural material, such as titanium. The cradles have axial end walls 23 and 24 joined to the top and bottom walls. The bottom wall secures the axial end walls so that they do not collapse on the magnets when the top wall is urged radially outward at high rotation speeds. The axial end walls 23, 24 have edges 26 that are configured to abut the dovetail surface 15 of the ribs. The space between the axial end walls of the cradles is large enough to span the axial length of the magnets and also the axial length of the laminated stacks. Preferably, the axial length of the magnets and the laminated stacks is identical. The cradles are secured against centrifugal force by the engagement of the dovetail surfaces on the cradles and the overhung ribs. It is important to note that centrifugal force exerted by the cradle is applied to the ribs.

Figure 6:
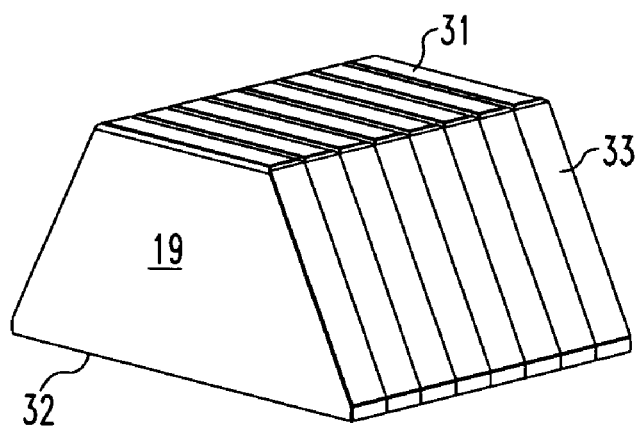
FIG. 6 is a perspective view of a magnet set.
Figure 7:
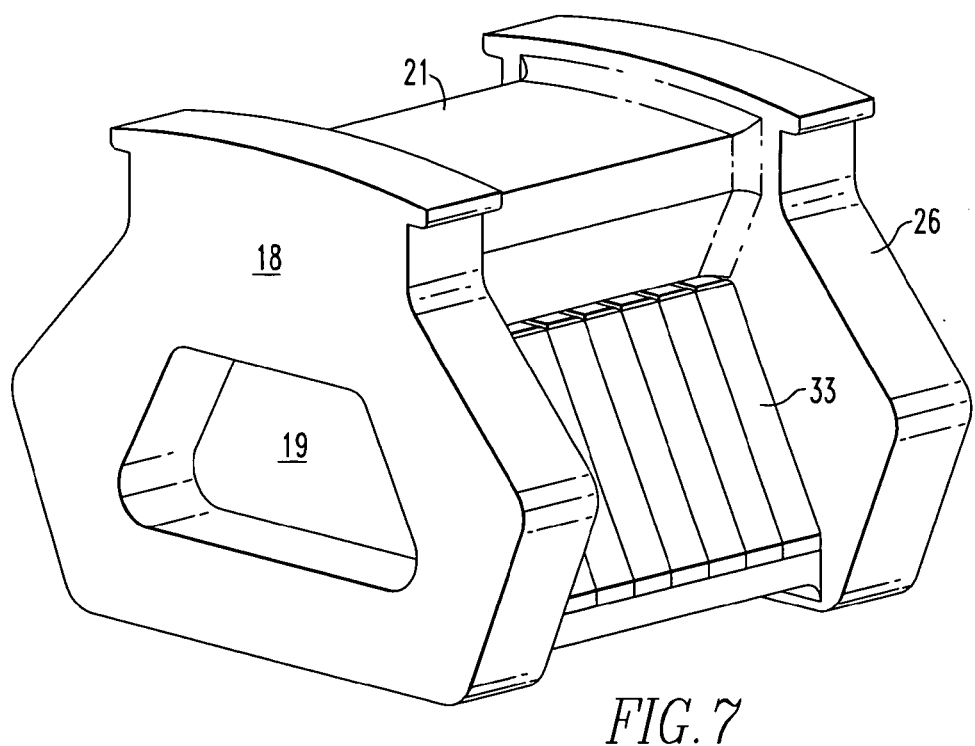
FIG. 7 is a perspective view of the magnet cradle with magnets in place.
Figure 8:
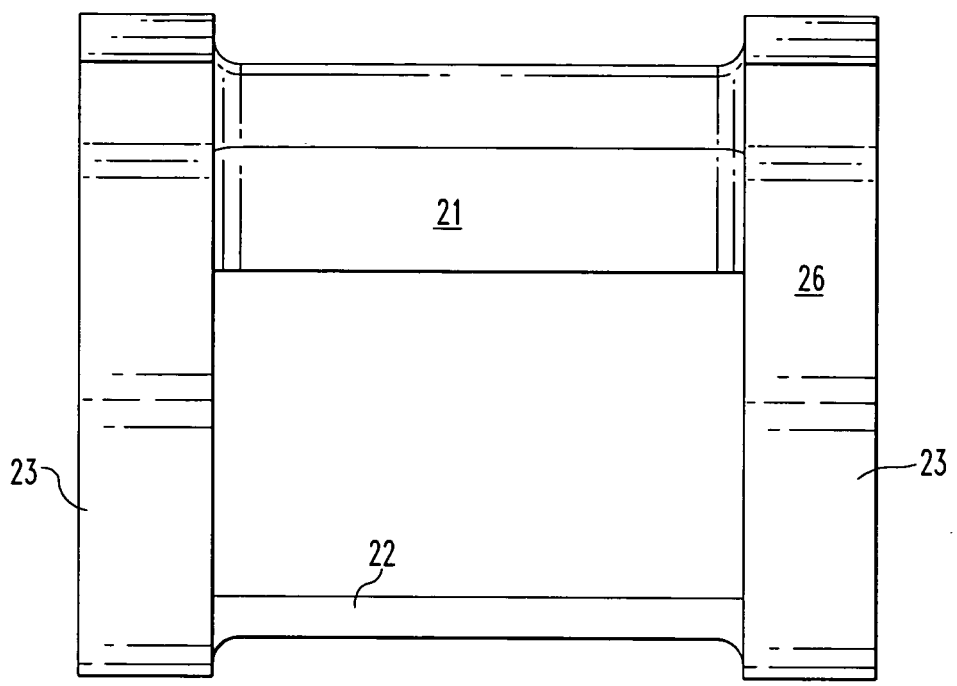
FIG. 8 is an axial end view of the magnet cradle.
Figure 9:
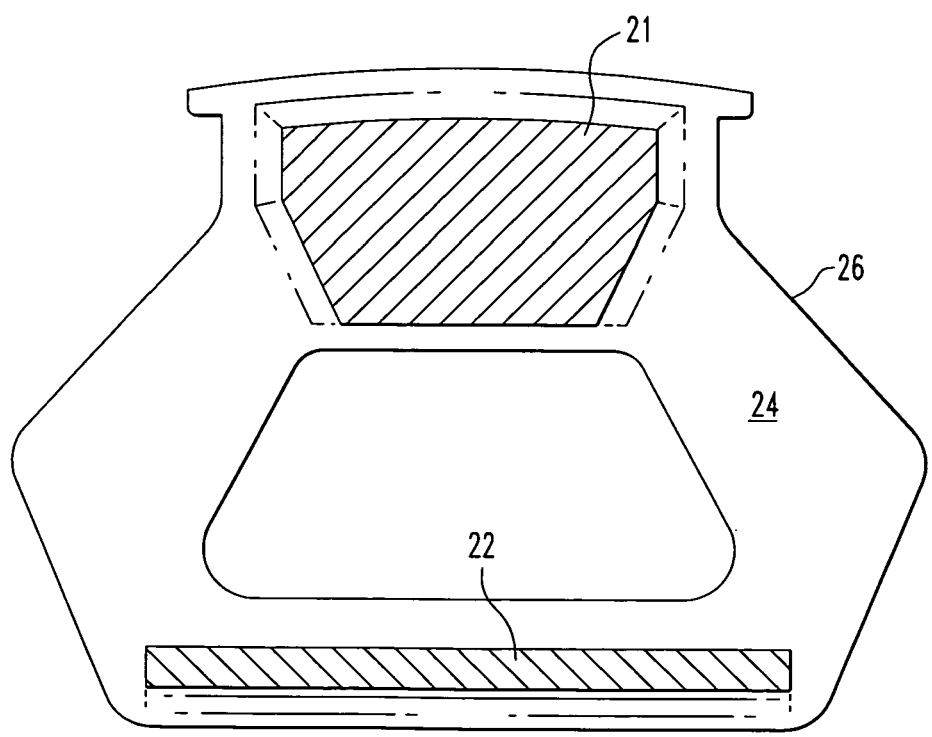
FIG. 9 is a section view through the cradle taken along a plane perpendicular to the axis of the rotor.

FIG. 6 illustrates the permanent magnets 19 and FIG. 7 illustrates the permanent magnets 19 inserted into cradle 18. The magnets have a bottom edge 32 that bears on the bottom wall 22 of the cradle 18 and a top edge 31 that bears on the top wall 21 of the cradle 18. The top and bottom edges of the magnets are generally parallel. Preferably, the magnets have a generally trapezoidal shape with the parallel edges lying on cords of a cross section of the cylindrical shaft. Other magnet configurations are possible, for example, the top and bottom edges of the magnets might by cylindrical with a cylindrical axis near the axis of rotation of the rotor shaft. In this case, the cradles would have top and bottom walls that have correspondingly cylindrical surfaces abutting the magnets. The circumferential edges (non-parallel edges) 33 of the magnets are exposed by the cradle. In this way, the edges of the magnets can abut the lamination stacks as best seen in FIG. 1. This is an essential feature of this invention. There exists no solid non-magnetic material between the magnets and the lamination and preferably the magnets tightly abut the laminations.

The magnets are typically rare earth permanent magnets. The magnets are magnetized with opposite poles at each circumferential edge face. The poles abutting any C-shaped lamination stack are of the same polarity. The portion of the lamination stack directly over each rib is a magnetic pole of the rotor. Note that no non-magnetic material is placed over the surface of the rotor and therefore the rotor poles can more closely approach stator winding for more efficient coupling.

Having thus defined my invention in the detail and particularity required by the patent laws, what is desired to be protected by Letters Patent is set forth in the following claims.

The invention claimed is:

1. A permanent magnet rotor assembly comprising:
    a non-magnetic cylindrical shaft having an axis of rotation and a generally cylindrical surface with an even number of recessed and overhung slots defining an even number of ribs therebetween;
    a plurality of generally C-shaped high magnetic permeability laminated stacks surrounding said ribs, each laminated stack abutting overhung portions of the ribs;
    a plurality of permanent magnets positioned in each recessed slot, said magnets having spaced circumferential end edge faces abutting the laminated stacks and said magnets having top and bottom faces, said magnets being magnetized with opposite poles at each circumferential end edge face and such that the poles abutting any C-shaped lamination stack are of identical polarity; and
    a plurality of non-magnetic cradles for supporting the permanent magnets in the recessed slots, each cradle having top and bottom walls abutting the top and bottom faces of the permanent magnets and each cradle having axial end walls with circumferential edges of said axial end walls directly abutting overhung portions of the ribs, the total axial length of the top wall of the cradles in the axial direction being greater than the total axial length of the lamination stacks and magnets permitting the laminated stacks and magnets to fit between the end walls of the cradle, whereby the magnets are secured against centrifugal force by the cradles bearing directly on the ribs.

2. A permanent magnet rotor assembly comprising:

a non-magnetic cylindrical shaft having an axis of rotation and a generally cylindrical surface with an even number of recessed and overhung slots defining an even number of ribs therebetween, said ribs having generally T-shaped cross sections taken in a plane perpendicular to said axis of rotation;

a plurality of generally C-shaped high magnetic permeability laminated stacks surrounding said ribs, the separations between individual plates forming the laminated stacks lying in planes perpendicular to said axis of rotation, each plate having edge faces abutting overhung portions of the ribs;

a plurality of permanent magnets positioned in each recessed slot, the separations between individual permanent magnets lying in planes perpendicular to said axis of rotation, said magnets having spaced circumferential edge faces abutting edge faces of the plates of the laminated stacks and said magnets having generally parallel top and bottom edge faces lying on cords of a cross section of the cylindrical shaft taken perpendicular to the axis of rotation, said magnets being magnetized with opposite poles at each circumferential edge face and such that the poles abutting any C-shaped lamination stack are of identical polarity; and a plurality of non-magnetic cradles for supporting the laminated permanent magnets in the recessed slots, each cradle having a top and bottom wall abutting the top and bottom edge faces of the individual sections of the laminated permanent magnets and each cradle having axial end walls with faces lying in planes perpendicular to the axis of rotation and with edges of said end walls directly abutting overhung portions of the T-shaped ribs, the total axial length of the top and bottom faces of the cradles being greater than the total axial length of the lamination stacks and laminated magnets permitting the laminated stacks and magnets to fit between extensions of the end walls of the cradle, whereby the magnets are secured against centrifugal force by the cradles bearing directly on the ribs.

3. A magnet cradle for supporting a permanent magnet in an overhung recessed slot on the surface of a permanent magnet rotor having an axis of rotation, said cradle being non-magnetic and comprising a top and bottom wall abutting the permanent magnet and sized to hold the permanent magnet within the overhung slots and axial end walls generally perpendicular to said axis of rotation and with circumferential edges of said axial end walls configured to directly abut overhung portions of said slots, the total axial length of the top and bottom walls of the cradles in the axial direction being greater than the total axial length of the magnets thereby permitting a magnet to fit between the axial end walls of the cradle and without the cradle in the magnetic flux path of the magnet.

* * * * *